United States Patent
Koga

(10) Patent No.: US 10,666,104 B2
(45) Date of Patent: May 26, 2020

(54) ROTATING ELECTRICAL MACHINE

(71) Applicant: AISIN AW CO., LTD., Anjo-shi, Aichi-ken (JP)

(72) Inventor: Kiyotaka Koga, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 527 days.

(21) Appl. No.: 15/544,396

(22) PCT Filed: Mar. 24, 2016

(86) PCT No.: PCT/JP2016/059467
§ 371 (c)(1),
(2) Date: Jul. 18, 2017

(87) PCT Pub. No.: WO2016/153001
PCT Pub. Date: Sep. 29, 2016

(65) Prior Publication Data
US 2018/0269741 A1    Sep. 20, 2018

(30) Foreign Application Priority Data

Mar. 24, 2015  (JP) ................................. 2015-060426
Mar. 27, 2015  (JP) ................................. 2015-065597

(51) Int. Cl.
| | |
|---|---|
| H02K 3/04 | (2006.01) |
| H02K 3/12 | (2006.01) |
| H02K 3/28 | (2006.01) |
| H02K 1/16 | (2006.01) |
| H02K 1/27 | (2006.01) |

(Continued)

(52) U.S. Cl.
CPC ................. *H02K 3/12* (2013.01); *H02K 1/16* (2013.01); *H02K 1/274* (2013.01); *H02K 3/28* (2013.01); *H02K 3/48* (2013.01); *H02K 15/085* (2013.01)

(58) Field of Classification Search
CPC ............. H02K 3/12; H02K 1/16; H02K 1/274
See application file for complete search history.

(56) References Cited

U.S. PATENT DOCUMENTS

| | | | |
|---|---|---|---|
| 2014/0125187 A1 | 5/2014 | Suzuki et al. | |
| 2014/0346914 A1 | 11/2014 | Funasaki et al. | |
| 2015/0381000 A1* | 12/2015 | Tamura | H02K 3/28 310/207 |

FOREIGN PATENT DOCUMENTS

| | | |
|---|---|---|
| EP | 1 128 525 A2 | 8/2001 |
| JP | 2005-124375 A | 5/2005 |

(Continued)

OTHER PUBLICATIONS

Jun. 21, 2016 International Search Report issued in Patent Application No. PCT/JP2016/059467.

*Primary Examiner* — Alexander Talpalatski
(74) *Attorney, Agent, or Firm* — Oliff PLC

(57) ABSTRACT

A rotating electrical machine where the concentric coil includes a first concentric coil, a second concentric coil, a third concentric coil, and a fourth concentric coil which are of the same phase and are connected in parallel with each other, and each of the first concentric coil, the second concentric coil, the third concentric coil, and the fourth concentric coil has a one-side concentric coil whose coil center is located on one side in a circumferential direction with respect to a center of a magnetic pole, and an other-side concentric coil whose coil center is located on the other side in the circumferential direction with respect to a center of a magnetic pole.

17 Claims, 5 Drawing Sheets

(51) Int. Cl.
  *H02K 3/48* (2006.01)
  *H02K 15/085* (2006.01)

(56) References Cited

FOREIGN PATENT DOCUMENTS

| | | |
|---|---|---|
| JP | 2012-125043 A | 6/2012 |
| JP | 2014-096857 A | 5/2014 |
| WO | 2013/157115 A1 | 10/2013 |

* cited by examiner

ROTATING ELECTRICAL MACHINE

BACKGROUND

The present disclosure relates to rotating electrical machines.

Conventionally, rotating electrical machines are known which include concentric coils of the same phase connected in parallel with each other.

A plurality of concentric coils (e.g., first to fourth round wire concentric coils) formed by concentrically winding a round wire and connected in parallel with each other are conventionally known in the art. Each of the first to fourth round wire concentric coils includes a plurality of coils (hereinafter referred to as the coil portions) connected in series with each other. The first to fourth round wire concentric coils are placed in slots of a stator core in order of the plurality of coil portions of the first round wire concentric coil, the plurality of coil portions of the second round wire concentric coil, the plurality of coil portions of the third round wire concentric coil, and the plurality of coil portions of the fourth round wire concentric coil (namely, the coils are wound around adjacent poles).

For example, in the case where the central axis of a rotor is not aligned with the central axis of a stator, the positional relationship between each permanent magnet placed in the rotor and each of the first to fourth round wire concentric coils may be imbalanced. In this case, a circulating current flows in the concentric coil, which results in generation of noise and vibration, etc.

In order to overcome this disadvantage, one of the coil portions of the first round wire concentric coil, one of the coil portions of the second round wire concentric coil, one of the coil portions of the third round wire concentric coil, and one of the coil portions of the fourth round wire concentric coil are conventionally placed in this order in the slots of the stator core (namely, the coils are wound around every other pole). This eliminates the imbalance in the positional relationship between each permanent magnet and each of the first to fourth round wire concentric coils and thus reduces generation of noise and vibration due to a circulating current in the concentric coil.

Conventionally, rotating electrical machines are also known which include a concentric coil formed by concentrically winding a rectangular wire. Such a rotating electrical machine is disclosed in, e.g., Japanese Patent Application Publication No. 2012-125043 (JP 2012-125043 A).

JP 2012-125043 A discloses a motor including a first concentric coil and a second concentric coil which are formed by concentrically winding a rectangular wire. The first concentric coil is formed by winding a rectangular wire so as to create a clearance between adjacent ones of the turns of the rectangular wire so that the rectangular wire of the second concentric coil can be inserted in the clearances. That is, in JP 2012-125043 A, portions of the rectangular wire of the first concentric coil and portions of the rectangular wire of the second concentric coil are alternately placed in each slot of a stator core in the radial direction of the stator core.

In the motor of JP 2012-125043 A, however, since the rectangular wire of the first concentric coil and the rectangular wire of the second concentric coil are mixedly present in each slot, it is difficult to wind the coils around every other pole in order to eliminate an imbalance in the positional relationship between each permanent magnet and each of the first and second concentric coils. It is therefore desired to reduce noise and vibration due to a circulating current in a concentric coil in rotating electrical machines including a concentric coil formed by concentrically winding a rectangular wire.

An exemplary aspect of the present disclosure provides a rotating electrical machine that includes a concentric coil formed by concentrically winding a rectangular wire and that can reduce generation of noise and vibration due to a circulating current in the concentric coil.

A rotating electrical machine according to one exemplary aspect of the present disclosure includes: a rotor core having a permanent magnet placed therein; a stator core placed so as to face the rotor core in a radial direction and having a plurality of slots; and a concentric coil formed by concentrically winding a rectangular wire and placed in the slots of the stator core. The concentric coil includes a first concentric coil, a second concentric coil, a third concentric coil, and a fourth concentric coil which are of the same phase and are connected in parallel with each other. Each of the first concentric coil, the second concentric coil, the third concentric coil, and the fourth concentric coil has a one-side concentric coil whose coil center is located on one side in a circumferential direction with respect to a center of a magnetic pole, and an other-side concentric coil whose coil center is located on the other side in the circumferential direction with respect to a center of a magnetic pole.

In the rotating electrical machine according to the exemplary aspect of the present disclosure, as described above, each of the first concentric coil, the second concentric coil, the third concentric coil, and the fourth concentric coil has the one-side concentric coil whose coil center is located on the one side in the circumferential direction with respect to the center of the magnetic pole, and the other-side concentric coil whose coil center is located on the other side in the circumferential direction with respect to the center of the magnetic pole. This prevents the concentric coil from being unevenly placed only on the one side or the other side in the circumferential direction with respect to the center of the magnetic pole, and thus can eliminate an imbalance in the positional relationship between the permanent magnet and the concentric coil. As a result, generation of noise and vibration due to a circulating current in the concentric coil can be reduced in the rotating electrical machine including the concentric coil formed by concentrically winding a rectangular wire. Adverse effects on torque of the rotating electrical machine due to the circulating current in the concentric coil can also be reduced.

According to the present disclosure, as described above, generation of noise and vibration due to a circulating current in a concentric coil can be reduced in a rotating electrical machine including a concentric coil formed by concentrically winding a rectangular wire.

DETAILED DESCRIPTION OF EMBODIMENTS

An embodiment of the present disclosure will be described below based on the drawings.

Embodiment (Structure of Rotating Electrical Machine)

The structure of a rotating electrical machine 100 according to the present embodiment will be described with reference to FIGS. 1 to 6.

Figure 1:
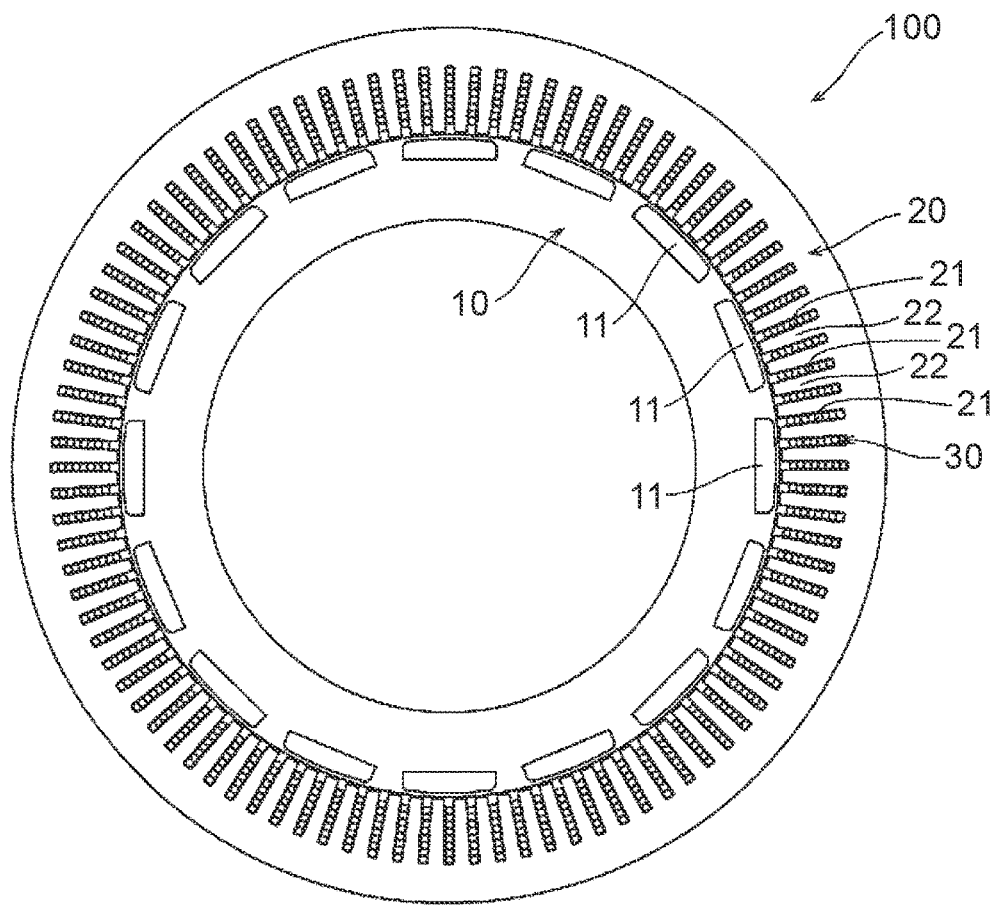
FIG. 1 is a plan view of a rotating electrical machine according to an embodiment of the present disclosure.

As shown in FIG. 1, the rotating electrical machine 100 includes a rotor core 10. The rotor core 10 has a plurality of (e.g., 16) permanent magnets 11 arranged therein in the circumferential direction. In the present embodiment, the plurality of permanent magnets 11 are arranged at substantially regular angular intervals (intervals of about 22.5 degrees) in the circumferential direction of the rotor core 10.

The rotating electrical machine 100 includes a stator core 20. The stator core 20 is placed so as to face the rotor core 10 in the radial direction. The stator core 20 has a plurality of (e.g., 96) slots 21. The stator core 20 has teeth 22 each located between adjacent ones of the slots 21.

The rotating electrical machine 100 includes a concentric coil 30 formed by concentrically winding a rectangular wire. The concentric coil 30 is placed in the slots 21 of the stator core 20.

Figure 4:
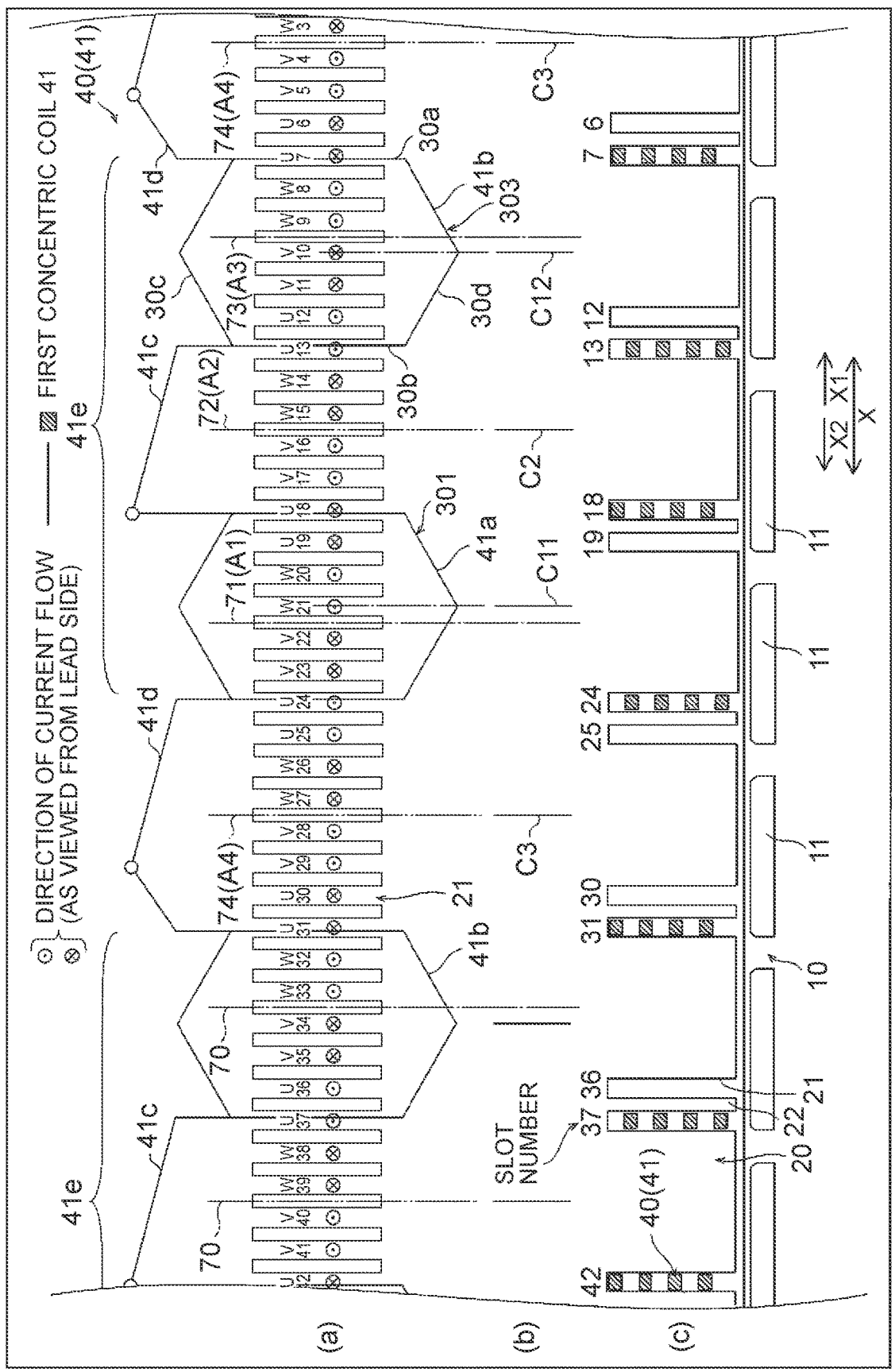
FIG. 4 is a partial enlarged view of FIG. 3, showing only a first concentric coil.

As shown in FIG. 4, the concentric coil 30 is a continuous coil comprised of a first slot accommodated portion 30a that is accommodated in a predetermined slot 21 and a second slot accommodated portion 30b that is accommodated in a slot 21 different from the predetermined slot 21 with both a first coil end portion 30c and a second coil end portion 30d between the first slot accommodated portion 30a and the second slot accommodated portion 30b. The first coil end portion 30c is a coil end portion that forms a coil end located on one side in the axial direction, and the second coil end portion 30d is a coil end portion that forms a coil end located on the other side in the axial direction. Specifically, the concentric coil 30 is a coil formed by continuously winding a single wire so as to form the first slot accommodated portion 30a, the first coil end portion 30c, the second slot accommodated portion 30b, and the second coil end portion 30d.

Figure 2:
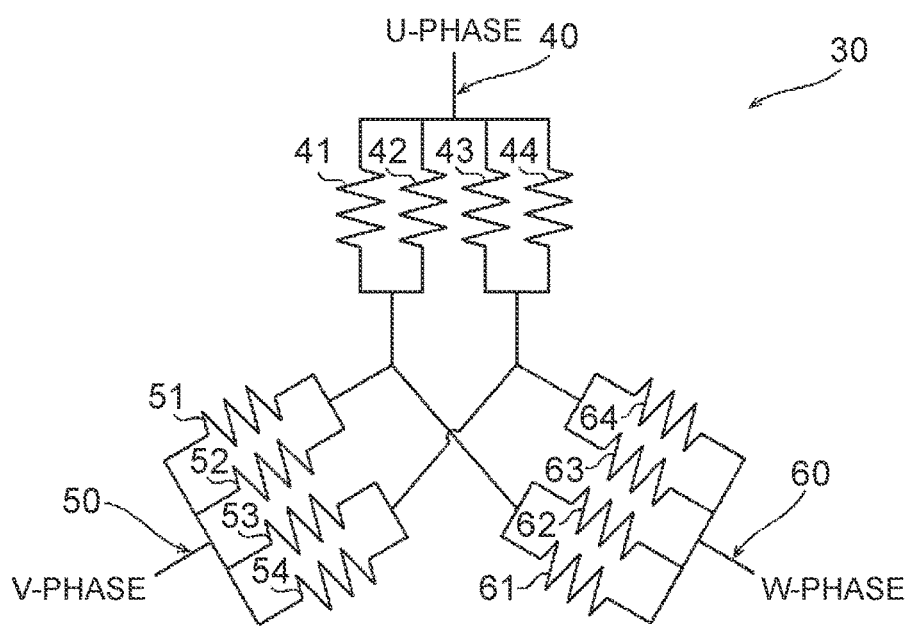
FIG. 2 is a circuit diagram of three-phase concentric coils connected in a Y-configuration according to the embodiment of the present disclosure.

As shown in FIG. 2, the concentric coil 30 includes a U-phase concentric coil 40, a V-phase concentric coil 50, and a W-phase concentric coil 60. The U-phase concentric coil 40 includes a U-phase first concentric coil 41, a U-phase second concentric coil 42, a U-phase third concentric coil 43, and a U-phase fourth concentric coil 44 which are connected in parallel with each other. The V-phase concentric coil 50 includes a V-phase first concentric coil 51, a V-phase second concentric coil 52, a V-phase third concentric coil 53, and a V-phase fourth concentric coil 54 which are connected in parallel with each other. The W-phase concentric coil 60 includes a W-phase first concentric coil 61, a W-phase second concentric coil 62, a W-phase third concentric coil 63, and a W-phase fourth concentric coil 64 which are connected in parallel with each other. In the present embodiment, the U-phase concentric coil 40, the V-phase concentric coil 50, and the W-phase concentric coil 60 are connected in a Y configuration.

The U-phase concentric coil 40, the V-phase concentric coil 50, and the W-phase concentric coil 60 are placed in the slots 21 in similar configurations. Accordingly, the U-phase concentric coil 40 will be described.

(Structure of U-Phase Concentric Coil)

<Structure of First Concentric Coil>

The first concentric coil 41 (coil shown by solid lines in FIGS. 3 and 4) will be described with reference to FIGS. 3 and 4. FIG. 4 shows only the U-phase first concentric coil 41 of the U-phase concentric coil 40. FIG. 4(a) shows the slots 21 and the first concentric coil 41 that is placed in the slots 21. FIG. 4(b) shows the centers (shown by long dashed double-short dashed lines) of magnetic poles 70 and the positions of coil centers (C11, C12) and connection centers (C2, C3) with respect to the centers (A1, A2, A3) of the magnetic poles 70. FIG. 4(c) shows the first concentric coil 41 formed by a rectangular wire and placed in the slots 21. FIG. 4(c) also shows the positional relationship of the permanent magnets 11 with respect to the slots 21. The numbers shown on top of the slots 21 in FIG. 4(c) denote slot numbers.

As shown in FIG. 4, the coil center (C11, C12) means a line segment extending in the axial direction and passing through the middle in the circumferential direction between the first slot accommodated portion 30a that is accommodated in the predetermined slot 21 and the second slot accommodated portion 30b that is accommodated in the slot 21 different from the predetermined slot 21 in the concentric coil 30. In the present embodiment, since the concentric coil 30 has a substantially hexagonal shape, bent parts of the first coil end portion 30c and the second coil end portion 30d correspond to the coil center. However, the present disclosure is not limited to this, and the coil center means a line segment extending in the axial direction and passing through the middle in the circumferential direction between the first slot accommodated portion 30a that is accommodated in the predetermined slot 21 and the second slot accommodated portion 30b that is accommodated in the slot 21 different from the predetermined slot 21 in the concentric coil 30.

In the present embodiment, as shown in FIG. 4, the first concentric coil 41 has a one-side concentric coil 41a whose coil center C11 is located on one side (X1 direction side) in the circumferential direction with respect to the center A1 of a first magnetic pole 71, and an other-side concentric coil 41b whose coil center is located on the other side (X2 direction side) in the circumferential direction with respect to the center A3 of a third magnetic pole 73. This will be specifically described below. Although representative portions of the first concentric coil 41 (one one-side concentric coil 41a, one first connection portion 41c described below, one other-side concentric coil 41b, and one second connection portion 41d described below) are described below, other portions are configured similarly.

Figure 5:
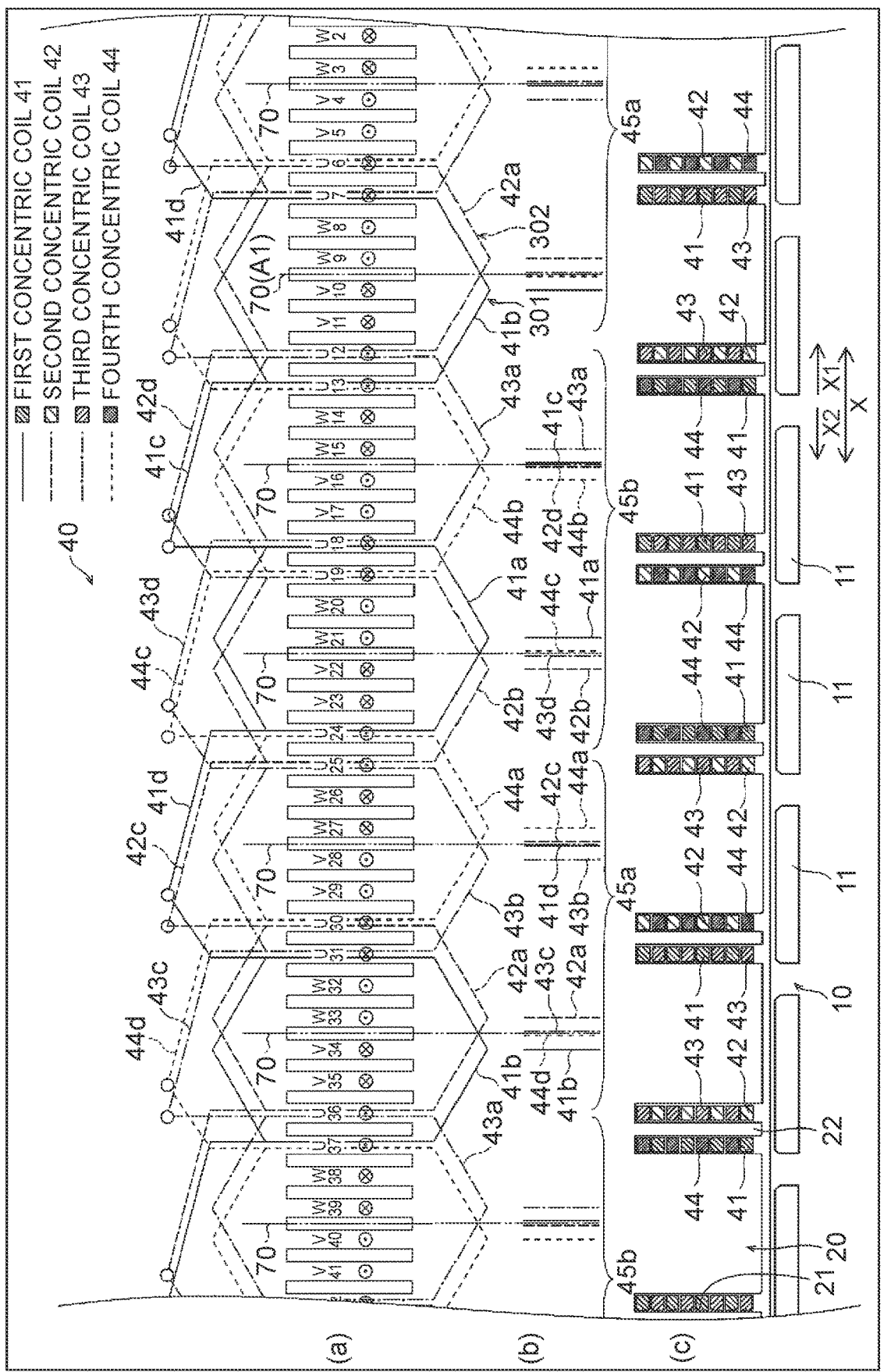
FIG. 5 is a partial enlarged view of FIG. 3.

The centers of the magnetic poles will be described. As shown in FIG. 5, a first concentric coil 301 and a second concentric coil 302 are concentric coils 30 that are of the same phase out of a plurality of phases (e.g., in the case of a three-phase configuration, three phases, namely U-phase, V-phase, and W-phase) formed by different concentric coils 30 and that are located next to each other in the circumferential direction. The first concentric coil 301 and the second concentric coil 302 have first slot accommodated portions 30a that are accommodated in adjacent ones of the slots 21 and second slot accommodated portions 30b that are accommodated in adjacent ones of the slots 21 which are separated by a predetermined interval in the circumferential direction from the slots 21 of the first slot accommodated portions 30a. In each of the first concentric coil 301 and the second concentric coil 302, the same wire is continuously wound to form the first slot accommodated portion 30a and the second slot accommodated portion 30b. The center (A1) of the magnetic pole means a line segment extending in the axial direction and passing through the middle in the circumferential direction between the coil centers of the concentric coil 301 and the second concentric coil 302 which are of the same phase and are located next to each other in the circumferential direction. As shown in FIG. 4, the first concentric coil 301 is connected via the first connection portion 41c to a first concentric coil 303 of the same phase which is accommodated in a slot 21 separated in the circumferential direction from the slot 21 of the first concentric coil 301, and the center (A2) of the magnetic pole means a line segment extending in the axial direction and passing through the middle in the circumferential direction between the centers of these concentric coils including the first connection portion 41c.

The one-side concentric coil 41a is placed in the slot 21 of slot number 24 and the slot 21 of slot number 18. That is, the pitch of the one-side concentric coil 41a is 6 slots. The other-side concentric coil 41b is placed in the slot 21 of slot number 13 and the slot 21 of slot number 7. That is, the pitch of the other-side concentric coil 41b is 6 slots.

In the present embodiment, the coil center C11 of the one-side concentric coil 41a is located on one side (X1 direction side) of the center A1 of the first magnetic pole 71 that is one of three adjacent magnetic poles, namely the first magnetic pole 71, a second magnetic pole 72, and the third magnetic pole 73. That is, the coil center C11 of the one-side concentric coil 41a is located in the slot 21 of slot number 21, which is a slot shifted by approximately ½ of the slot width in the X1 direction with respect to the center A1 (the position between slot number 22 and slot number 21) of the first magnetic pole 71.

The coil center C12 of the other-side concentric coil 41b is located on the other side (X2 direction side) of the center A3 of the third magnetic pole 73. That is, the coil center C12 of the other-side concentric coil 41b is located in the slot 21 of slot number 10, which is a slot shifted by approximately ½ of the slot in the X2 direction with respect to the center A3 (the position between slot number 10 and slot number 9) of the third magnetic pole 73.

The first connection portion 41c is formed to connect the one-side concentric coil 41a and the other-side concentric coil 41b. The first connection portion 41c is placed so as to extend in the circumferential direction from the slot 21 of slot number 18 to the slot 21 of slot number 13. That is, the pitch of the first connection portion 41c is 5 slots. The connection center C2 of the first connection portion 41c connecting the one-side concentric coil 41a and the other-side concentric coil 41b is located on the center A2 (the position between slot number 16 and slot number 15) of the second magnetic pole 72.

In the present embodiment, a plurality of (four) sets 41e of the one-side concentric coil 41a, the first connection portion 41c, and the other-side concentric coil 41b are arranged in the circumferential direction. The first concentric coil 41 includes the second connection portion 41d connecting the other-side concentric coil 41b of one of two sets 41e that are adjacent to each other and the one-side concentric coil 41a of the other set 41e. The second connection portion 41d has a length different form that of the first connection portion 41c. Specifically, the second connection portion 41d is placed so as to extend in the circumferential direction from the slot 21 of slot number 31 and the slot 21 of slot number 24. That is, the pitch of the second connection portion 41b is 7 slots. The length of the second connection portion 41d (pitch of 7 slots) is thus longer than the length of the first connection portion 41c (pitch of 5 slots). The connection center C3 of the second connection portion 41d is located on the center A4 (the position between slot number 28 and slot number 27) of a fourth magnetic pole 74.

The first concentric coil 41 is configured so that the one-side concentric coil 41a, the first connection portion 41c, the other-side concentric coil 41b, and the second connection portion 41d are arranged in this order in the entire region of the first concentric coil 41.

<Structure of Second to Fourth Concentric Coils>

Each of the second concentric coil 42, the third concentric coil 43, and the fourth concentric coil 44 has a configuration similar to that of the first concentric coil 41. That is, as shown in FIG. 5, the second concentric coil 42 (coil shown by dashed line in FIG. 5) includes a one-side concentric coil 42a, an other-side concentric coil 42b, a first connection portion 42c, and a second connection portion 42d. The third concentric coil 43 (coil shown by alternate long and short dash line in FIG. 5) includes a one-side concentric coil 43a, an other-side concentric coil 43b, a first connection portion 43c, and a second connection portion 43d. The fourth concentric coil 44 (coil shown by dotted line in FIG. 5) includes a one-side concentric coil 44a, an other-side concentric coil 44b, a first connection portion 44c, and a second connection portion 44d.

Representative portions of the second concentric coil 42, the third concentric coil 43, and the fourth concentric coil 44 will be specifically described below with reference to FIG. 6. FIG. 6(c) schematically shows how the first to fourth concentric coils 41 to 44 are arranged. The one-side concentric coils and the other-side concentric coils, each placed so as to extend across a plurality of slots 21, are shown by "ellipses," and the first connection portions and the second connection portions are shown by "straight lines."

Figure 6:
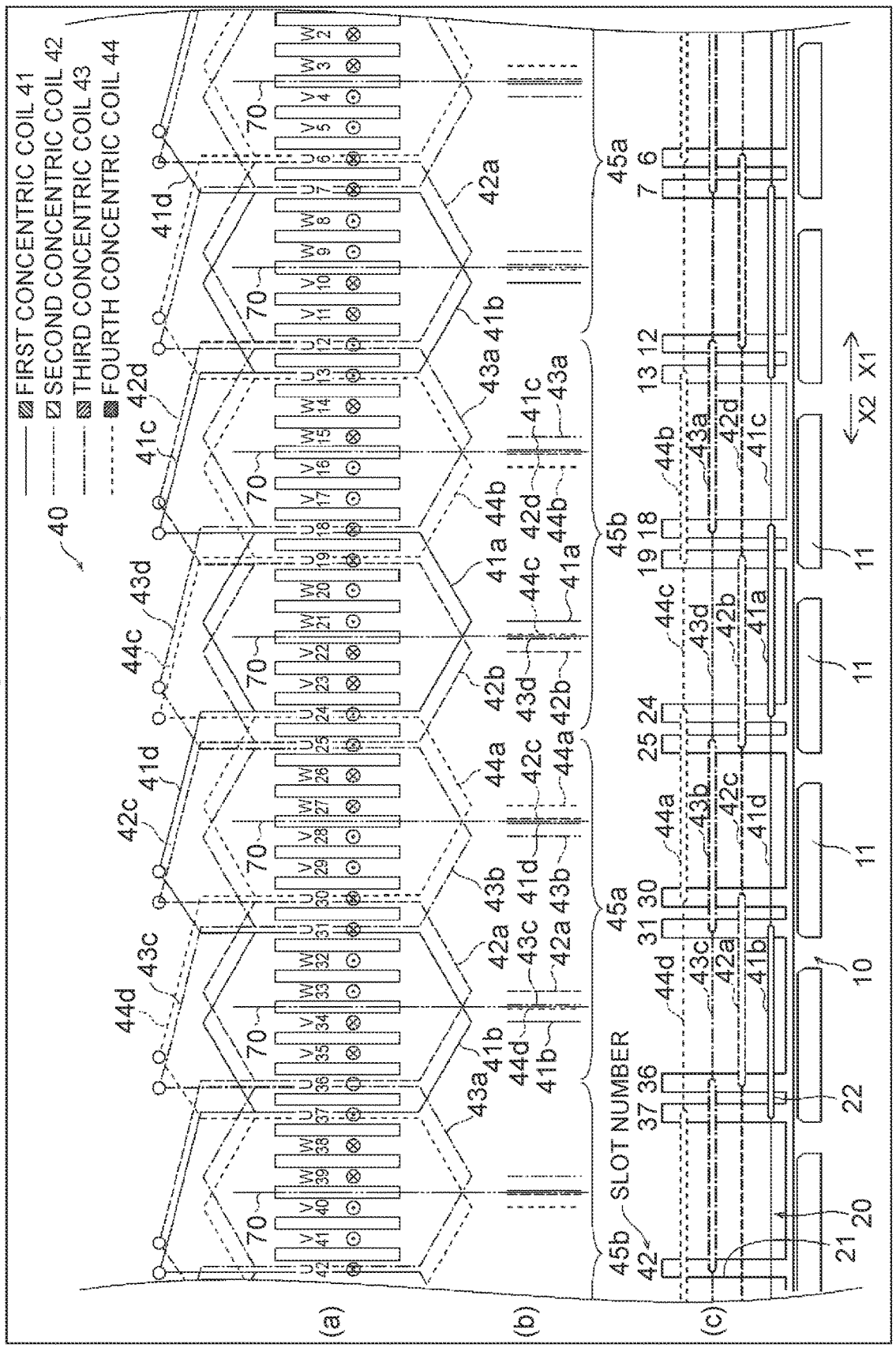
FIG. 6 is a partial enlarged view of FIG. 3, schematically illustrating how first to fourth concentric coils are arranged.

As shown in FIG. 6, the one-side concentric coil 42a of the second concentric coil 42 is placed in the slot 21 of slot number 36 and the slot 21 of slot number 30 (pitch of 6 slots). The other-side concentric coil 42b is placed in the slot 21 of slot number 25 and the slot 21 of slot number 19 (pitch of 6 slots). The first connection portion 42c is placed so as to extend in the circumferential direction from the slot 21 of slot number 30 to the slot 21 of slot number 25 (pitch of 5 slots). The third connection portion 42d is placed so as to extend in the circumferential direction from the slot 21 of slot number 19 to the slot 21 of slot number 12 (pitch of 7 slots).

The one-side concentric coil 43a of the third concentric coil 43 is placed in the slot 21 of slot number 18 and the slot 21 of slot number 12 (pitch of 6 slots). The other-side concentric coil 43b is placed in the slot 21 of slot number 31 and the slot 21 of slot number 25 (pitch of 6 slots). The first connection portion 43c is placed so as to extend in the circumferential direction from the slot 21 of slot number 36 to the slot 21 of slot number 31 (pitch of 5 slots). The second connection portion 43d is placed so as to extend in the circumferential direction from the slot 21 of slot number 25 to the slot 21 of slot number 18 (pitch of 7 slots).

The one-side concentric coil 44a of the fourth concentric coil 44 is placed in the slot 21 of slot number 30 and the slot 21 of slot number 24 (pitch of 6 slots). The other-side concentric coil 44b is placed in the slot 21 of slot number 19 and the slot 21 of slot number 13 (pitch of 6 slots). The first connection portion 44c is placed so as to extend in the circumferential direction from the slot 21 of slot number 24 to the slot 21 of slot number 19 (pitch of 5 slots). The second connection portion 44d is placed so as to extend in the circumferential direction from the slot 21 of slot number 37 to the slot 21 of slot number 30 (pitch of 7 slots).

The rotating electrical machine 100 thus has two of the first concentric coil 41, the second concentric coil 42, the third concentric coil 43, and the fourth concentric coil 44 in each slot 21.

In the present embodiment, the concentric coil 40 includes first groups 45a each comprised of the other-side concentric coil 41b of the first concentric coil 41, the one-side concentric coil 42a of the second concentric coil 42, the other-side concentric coil 43b of the third concentric coil 43, and the one-side concentric coil 44a of the fourth concentric coil 44 which are placed in the slots 21 in this order. The concentric coil 40 further includes second groups 45b each comprised of the other-side concentric coil 42b of the second concentric coil 42, the one-side concentric coil 41a of the first concentric coil 41, the other-side concentric coil 44b of the fourth concentric coil 44, and the one-side concentric coil 43a of the third concentric coil 43 which are placed in the slots 21 in this order. The first groups 45a and the second groups 46b are arranged alternately in the circumferential direction (X direction) in the slots 21.

Figure 3:
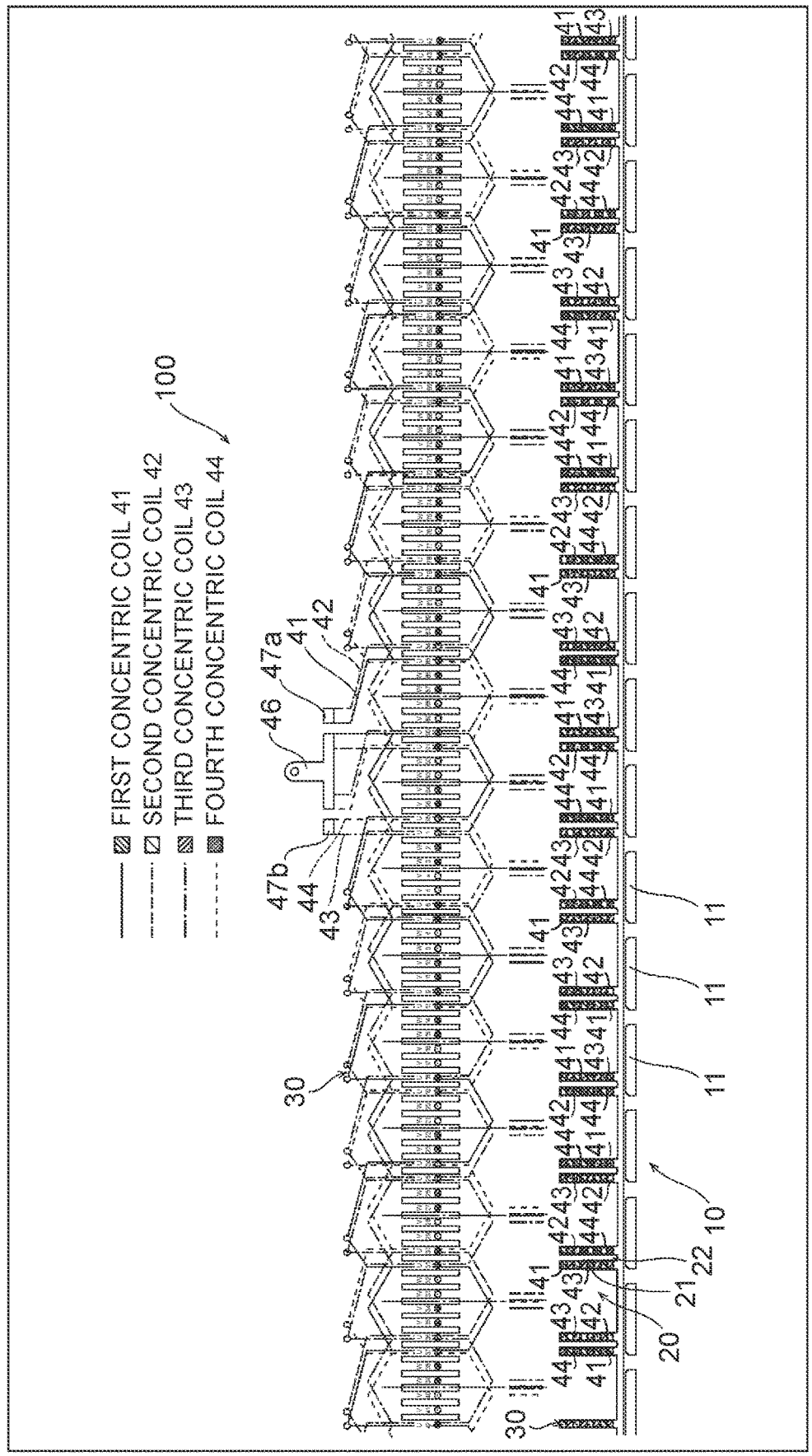
FIG. 3 is a diagram showing a U-phase concentric coil placed in slots according to the embodiment of the present disclosure.

As shown in FIG. 3, a power line 46 is connected to the first concentric coil 41, the second concentric coil 42, the third concentric coil 43, and the fourth concentric coil 44. The first concentric coil 41 and the second concentric coil 42 are connected to a neutral line 47a. The third concentric coil 43 and the fourth concentric coil 44 are connected to a neutral line 47b. Specifically, a portion corresponding to the first connection portion 41c (or the second connection portion 41d) connected to one of the plurality of first concentric coils 41 which is provided at one end is connected to the power line 46. A portion corresponding to the first connection portion 41c (or the second connection portion 41d) connected to one of the plurality of first concentric coils 41 which is provided at the other end is connected to the neutral line 47a (47b). The same applies to the second concentric coil 42, the third concentric coil 43, and the fourth concentric coil 44.

(Structure of V- and W-Phase Concentric Coils)

The V-phase concentric coil 50 and the W-phase concentric coil 60 have a configuration similar to that of the U-phase concentric coil 40. That is, in the present embodiment, each of the first concentric coil 51, the second concentric coil 52, the third concentric coil 53, and the fourth concentric coil 54 of the V-phase concentric coil 50 has one-side concentric coils whose coil centers are each located on the one side in the circumferential direction with respect to the center of a magnetic pole 70, and other-side concentric coils whose coil centers are each located on the other side in the circumferential direction with respect to the center of a magnetic pole 70. Each of the first concentric coil 61, the second concentric coil 62, the third concentric coil 63, and the fourth concentric coil 64 of the W-phase concentric coil 60 has one-side concentric coils whose coil centers are each located on the one side in the circumferential direction with respect to the center of a magnetic pole 70, and other-side concentric coils whose coil centers are each located on the other side in the circumferential direction with respect to the center of a magnetic pole 70.

[Effects of the Embodiment]

The present embodiment has the following effects. Although effects of the U-phase concentric coil 40 are described below, the V-phase concentric coil 50 and the W-phase concentric coil 60 also have effects similar to those of the U-phase concentric coil 40.

In the present embodiment, as described above, each of the first concentric coil 41, the second concentric coil 42, the third concentric coil 43, and the fourth concentric coil 44 has the one-side concentric coil 41a (42a, 43a, 44a) and the other-side concentric coil 41b (42b, 43b, 44b) whose coil centers C11, C12 are located on the one side in the circumferential direction and the other side in the circumferential direction with respect to the centers of the magnetic poles 70 (the center A1 of the first magnetic pole 71 and the center A3 of the third magnetic pole 73). This prevents the concentric coil 40 from being unevenly placed only on the one side or the other side in the circumferential direction with respect to the center of the magnetic pole 70, and thus can eliminate an imbalance in the positional relationship between each permanent magnet 11 and the concentric coil 40. As a result, generation of noise and vibration due to a circulating current in the concentric coil 40 can be reduced in the rotating electrical machine 100 including the concentric coil 40 formed by concentrically winding a rectangular wire. Adverse effects on torque of the rotating electrical machine 100 due to the circulating current in the concentric coil 40 can also be reduced.

Although effects of the first concentric coil 41 are described below, the second concentric coil 42, the third concentric coil 43, and the fourth concentric coil 44 also have effects similar to those of the first concentric coil 41.

In the present embodiment, as described above, the first connection portion 41c is formed to connect the one-side concentric coil 41a and the other-side concentric coil 41b. The coil center C11 of the one-side concentric coil 41a is located on the one side of the center A1 of the first magnetic pole 71 that is one of three adjacent magnetic poles, namely the first magnetic pole 71, the second magnetic pole 72, and the third magnetic pole 73, and the coil center C12 of the other-side concentric coil 41b is located on the other side of the center A3 of the third magnetic pole 73. The connection center C2 of the first connection portion 41c is located on the center A2 of the second magnetic pole 72. Accordingly, in the case where each set 41e is comprised of the one-side concentric coil 41a, the first connection portion 41c, and the other-side concentric coil 41b, the center of the set 41e is located on the center A2 of the second magnetic pole 72, whereby the balanced positional relationship between each permanent magnet 11 and the set 41e can be maintained.

In the present embodiment, as described above, the plurality of (four) sets 41e of the one-side concentric coil 41a, the first connection portion 41c, and the other-side concentric coil 41b are arranged in the circumferential direction. This can eliminate an imbalance in the positional relationship between each permanent magnet 11 and the concentric coil 40 along the entire circumference.

In the present embodiment, as described above, the second connection portion 41d is formed which connects the other-side concentric coil 41b of one of two sets 41e that are adjacent to each other and the one-side concentric coil 41a of the other set 41e and which has a length different form that of the first connection portion 41c. Accordingly, the average length of the first connection portion 41c and the second connection portion 41d is equal to the length of a connection portion in the configuration in which the coil centers are not shifted with respect to the centers of the magnetic poles 70. That is, even though the coil centers C11, C12 are shifted to the one side and the other side in the circumferential direction with respect to the centers of the magnetic poles 70, the present embodiment can be configured without changing the overall length of the connection portions.

In the present embodiment, as described above, the concentric coil 40 includes the first groups 45*a* each comprised of the other-side concentric coil 41*b* of the first concentric coil 41, the one-side concentric coil 42*a* of the second concentric coil 42, the other-side concentric coil 43*b* of the third concentric coil 43, and the one-side concentric coil 44*a* of the fourth concentric coil 44 which are placed in the slots 21 in this order. The concentric coil 40 further includes the second groups 45*b* each comprised of the other-side concentric coil 42*b* of the second concentric coil 42, the one-side concentric coil 41*a* of the first concentric coil 41, the other-side concentric coil 44*b* of the fourth concentric coil 44, and the one-side concentric coil 43*a* of the third concentric coil 43 which are placed in the slots 21 in this order. The first groups 45*a* and the second groups 46*b* are arranged alternately in the circumferential direction in the slots 21. This can eliminate an imbalance in the positional relationship between each permanent magnet 11 and the concentric coil 40 in the circumferential direction (along the entire circumference).

In the present embodiment, as described above, the plurality of permanent magnets 11 are arranged at substantially regular angular intervals in the circumferential direction of the rotor core 10. This prevents the positional relationship between the permanent magnet 11 and the concentric coil 40 to vary from permanent magnet 11 to permanent magnet 11. Accordingly, the configuration in which the first concentric coil 41 has the one-side concentric coil 41*a* and the other-side concentric coil 41*b* can eliminate an imbalance in the positional relationship between each of the plurality of permanent magnets 11 and the concentric coil 40.

Effects of the three-phase concentric coils 40, 50, 60 will be described below.

In the present embodiment, as described above, the concentric coil 30 includes the three-phase concentric coils 40, 50, 60, and each of the three-phase concentric coils 40, 50, 60 includes the first concentric coil 41, 51, 61, the second concentric coil 42, 52, 62, the third concentric coil 43, 53, 63, and the fourth concentric coil 44, 54, 64 which are of the same phase and are connected in parallel with each other. Each of the first concentric coil 41, 51, 61, the second concentric coil 42, 52, 62, the third concentric coil 43, 53, 63, and the fourth concentric coil 44, 54, 64 of each of the three-phase concentric coils 40, 50, 60 has one-side concentric coils whose coil centers are each located on one side in the circumferential direction with respect to the center of a magnetic pole 70 and other-side concentric coils whose coil centers are each located on the other side in the circumferential direction with respect to the center of a magnetic pole 70. This can eliminate an imbalance in the positional relationship between each permanent magnet 11 and the concentric coil 40, 50, 60 in all of the three-phase concentric coils 40, 50, 60.

In the present embodiment, as described above, the concentric coil 30 includes the three-phase concentric coils 40, 50, 60, and the three-phase concentric coils 40, 50, 60 are connected in a Y-configuration. This can eliminate an imbalance in the positional relationship between each permanent magnet 11 and the concentric coil 40, 50, 60 in the three-phase concentric coils 40, 50, 60 connected in a Y-configuration.

[Modifications]

The embodiment disclosed herein is by way of example in all respects and should not be interpreted as restrictive. The scope of the present disclosure is defined by the claims rather than by the description of the above embodiment, and includes all changes (modifications) that fall within the scope of the claims and the meaning and scope of equivalence.

For example, the above embodiment is described with respect to the example in which each of the one-side concentric coil and the other-side concentric coil is located at a position shifted by approximately ½ of the slot to one side or the other side with respect to the center of a magnetic pole. However, the present disclosure is not limited to this. In the present disclosure, each of the one-side concentric coil and the other-side concentric coil may be located at a position shifted by a distance other than approximately ½ of the slot to one side or the other side with respect to the center of a magnetic pole.

The above embodiment is described with respect to the example in which the stator core has 96 slots. However, the present disclosure is not limited to this. In the present disclosure, the number of slots may be other than 96.

The above embodiment is described with respect to the example in which the pitch of the one-side concentric coil and the pitch of the other-side concentric coil are 6 slots. However, the present disclosure is not limited to this. In the present disclosure, the pitch of the one-side concentric coil and the pitch of the other-side concentric coil may be other than 6 slots.

The above embodiment is described with respect to the example in which the pitch of the first connection portion is 5 slots and the pitch of the second connection portion is 7 slots. However, the present disclosure is not limited to this. In the present disclosure, the pitch of the first connection portion may be other than 5 slots and the pitch of the second connection portion may be other than 7 slots.

The above embodiment is described with respect to the example in which the concentric coil includes the three-phase concentric coils. However, the present disclosure is not limited to this. In the present disclosure, the concentric coil may include concentric coils of the number of phases other than three.

The above embodiment is described with respect to the example in which the three-phase concentric coils are connected in a Y-configuration. However, the present disclosure is not limited to this. In the present disclosure, the three-phase concentric coils may be connected in a Δ-configuration.

The invention claimed is:

1. A rotating electrical machine, comprising:
    a rotor core having a permanent magnet placed therein;
    a stator core placed so as to face the rotor core in a radial direction and having a plurality of slots; and
    a concentric coil formed by concentrically winding a rectangular wire and placed in the slots of the stator core, wherein
        the concentric coil includes a first concentric coil, a second concentric coil, a third concentric coil, and a fourth concentric coil which are of the same phase and are connected in parallel with each other, and
        each of the first concentric coil, the second concentric coil, the third concentric coil, and the fourth concentric coil has a one-side concentric coil whose coil center is located on one side in a circumferential direction with respect to a center of a magnetic pole, and an other-side concentric coil whose coil center is located on the other side in the circumferential direction with respect to a center of a magnetic pole.

2. The rotating electrical machine according to claim 1, further comprising:

a first connection portion connecting the one-side concentric coil and the other-side concentric coil, wherein of a first magnetic pole, a second magnetic pole, and a third magnetic pole which are three adjacent magnetic poles, the coil center of the one-side concentric coil is located on one side of a center of the first magnetic pole, the coil center of the other-side concentric coil is located on the other side of a center of the third magnetic pole, and a connection center of the first connection portion is located on a center of the second magnetic pole.

3. The rotating electrical machine according to claim 2, wherein
a plurality of sets of the one-side concentric coil, the first connection portion, and the other-side concentric coil are arranged in the circumferential direction.

4. The rotating electrical machine according to claim 3, further comprising:
a second connection portion which connects the other-side concentric coil of one of two sets adjacent to each other, of the plurality of the sets, and the one-side concentric coil of the other set and which has a length different from that of the first connection portion.

5. The rotating electrical machine according to claim 4, wherein
the concentric coil includes: first groups each comprised of the other-side concentric coil of the first concentric coil, the one-side concentric coil of the second concentric coil, the other-side concentric coil of the third concentric coil, and the one-side concentric coil of the fourth concentric coil which are placed in the slots in this order; and second groups each comprised of the other-side concentric coil of the second concentric coil, the one-side concentric coil of the first concentric coil, the other-side concentric coil of the fourth concentric coil, and the one-side concentric coil of the third concentric coil which are placed in the slots in this order, and
the first groups and the second groups are arranged alternately in the circumferential direction in the slots.

6. The rotating electrical machine according to claim 5, wherein
a plurality of the permanent magnets are arranged at substantially regular angular intervals in the circumferential direction of the rotor core.

7. The rotating electrical machine according to claim 6, wherein
the concentric coil includes three-phase concentric coils,
each of the three-phase concentric coils includes the first concentric coil, the second concentric coil, the third concentric coil, and the fourth concentric coil which are of the same phase and are connected in parallel with each other, and
each of the first concentric coil, the second concentric coil, the third concentric coil, and the fourth concentric coil of each of the three-phase concentric coils has the one-side concentric coil whose coil center is located on the one side in the circumferential direction with respect to the center of the magnetic pole, and the other-side concentric coil whose coil center is located on the other side in the circumferential direction with respect to the center of the magnetic pole.

8. The rotating electrical machine according to claim 7, wherein
the concentric coil includes three-phase concentric coils, and the three-phase concentric coils are connected in a Y-configuration.

9. The rotating electrical machine according to claim 1, wherein
the concentric coil includes: first groups each comprised of the other-side concentric coil of the first concentric coil, the one-side concentric coil of the second concentric coil, the other-side concentric coil of the third concentric coil, and the one-side concentric coil of the fourth concentric coil which are placed in the slots in this order, and second groups each comprised of the other-side concentric coil of the second concentric coil, the one-side concentric coil of the first concentric coil, the other-side concentric coil of the fourth concentric coil, and the one-side concentric coil of the third concentric coil which are placed in the slots in this order, and
the first groups and the second groups are arranged alternately in the circumferential direction in the slots.

10. The rotating electrical machine according to claim 9, wherein
a plurality of the permanent magnets are arranged at substantially regular angular intervals in the circumferential direction of the rotor core.

11. The rotating electrical machine according to claim 10, wherein
the concentric coil includes three-phase concentric coils,
each of the three-phase concentric coils includes the first concentric coil, the second concentric coil, the third concentric coil, and the fourth concentric coil which are of the same phase and are connected in parallel with each other, and
each of the first concentric coil, the second concentric coil, the third concentric coil, and the fourth concentric coil of each of the three-phase concentric coils has the one-side concentric coil whose coil center is located on the one side in the circumferential direction with respect to the center of the magnetic pole, and the other-side concentric coil whose coil center is located on the other side in the circumferential direction with respect to the center of the magnetic pole.

12. The rotating electrical machine according to claim 11, wherein
the concentric coil includes three-phase concentric coils, and the three-phase concentric coils are connected in a Y-configuration.

13. The rotating electrical machine according to claim 1, wherein
a plurality of the permanent magnets are arranged at substantially regular angular intervals in the circumferential direction of the rotor core.

14. The rotating electrical machine according to claim 13, wherein
the concentric coil includes three-phase concentric coils,
each of the three-phase concentric coils includes the first concentric coil, the second concentric coil, the third concentric coil, and the fourth concentric coil which are of the same phase and are connected in parallel with each other, and
each of the first concentric coil, the second concentric coil, the third concentric coil, and the fourth concentric coil of each of the three-phase concentric coils has the one-side concentric coil whose coil center is located on the one side in the circumferential direction with respect to the center of the magnetic pole, and the other-side concentric coil whose coil center is located on the other side in the circumferential direction with respect to the center of the magnetic pole.

15. The rotating electrical machine according to claim 14, wherein
the concentric coil includes three-phase concentric coils, and the three-phase concentric coils are connected in a Y-configuration.

16. The rotating electrical machine according to claim 1, wherein
the concentric coil includes three-phase concentric coils,
each of the three-phase concentric coils includes the first concentric coil, the second concentric coil, the third concentric coil, and the fourth concentric coil which are of the same phase and are connected in parallel with each other, and
each of the first concentric coil, the second concentric coil, the third concentric coil, and the fourth concentric coil of each of the three-phase concentric coils has the one-side concentric coil whose coil center is located on the one side in the circumferential direction with respect to the center of the magnetic pole, and the other-side concentric coil whose coil center is located on the other side in the circumferential direction with respect to the center of the magnetic pole.

17. The rotating electrical machine according to claim 1, wherein
the concentric coil includes three-phase concentric coils, and the three-phase concentric coils are connected in a Y-configuration.

\* \* \* \* \*